US012480998B2

(12) United States Patent
Ota

(10) Patent No.: US 12,480,998 B2
(45) Date of Patent: Nov. 25, 2025

(54) FULL CHARGE CAPACITY ESTIMATION DEVICE AND METHOD

(71) Applicant: TOYOTA JIDOSHA KABUSHIKI KAISHA, Toyota (JP)

(72) Inventor: Yuichi Ota, Mitaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/407,596

(22) Filed: Jan. 9, 2024

(65) Prior Publication Data

US 2024/0353496 A1 Oct. 24, 2024

(30) Foreign Application Priority Data

Apr. 18, 2023 (JP) .................................. 2023-067740

(51) Int. Cl.
*G01R 31/3835* (2019.01)
(52) U.S. Cl.
CPC ................ *G01R 31/3835* (2019.01)
(58) Field of Classification Search
None
See application file for complete search history.

(56) References Cited

U.S. PATENT DOCUMENTS

2022/0221520 A1* 7/2022 Imanaka ........... H02J 7/007182

FOREIGN PATENT DOCUMENTS

JP 2022-139652 A 9/2022

* cited by examiner

*Primary Examiner* — Jas A Sanghera
(74) *Attorney, Agent, or Firm* — SoraIP, Inc.

(57) ABSTRACT

This device estimates the full charge capacity of a redundant system battery that supplies electric power to a redundant vehicle load, and includes an acquisition unit that acquires battery voltage, a determination unit that determines whether the polarization of the battery has been resolved after the ignition switch of the vehicle is turned off, a measurement unit that measures, when it is determined that the polarization has been resolved, the time from the time of determination until the voltage of the battery decreases to a first threshold due to dark current consumption, and a calculation unit that calculates, when the measurement time is greater than or equal to a second threshold, the battery state of charge based on the SOC-OCV characteristic curve before deterioration, and calculates, when the measurement time is less than the second threshold, the battery state of charge based on the SOC-OCV characteristic curve after deterioration.

6 Claims, 4 Drawing Sheets

FULL CHARGE CAPACITY ESTIMATION DEVICE AND METHOD

CROSS-REFERENCE TO RELATED APPLICATION

This application claims priority to Japanese Patent Application No. 2023-067740 filed on Apr. 18, 2023, incorporated herein by reference in its entirety.

BACKGROUND

1. Technical Field

The present disclosure relates to a device and a method for estimating a full charge capacity of a redundant system battery.

2. Description of Related Art

Japanese Unexamined Patent Application Publication No. 2022-139652 (JP 2022-139652 A) discloses a power storage device that can accurately estimate a full charge capacity of a lithium-ion battery having a cathode using graphite.

SUMMARY

A method of estimating a full charge capacity of a battery is to temporarily discharge the battery to a low state of charge (SOC) that is set in advance, and following the discharging, charge the battery again until reaching a high state of charge that is set in advance, which is the so-called current integration method.

In systems that require a redundant power supply configuration, a sub-battery is redundantly provided as a secondary power supply to back up a main battery that is a primary power supply. This sub-battery must always maintain a high state of charge (for example, 90% or more) in preparation for a situation in which the main battery fails. Accordingly, in the method that uses the current integration method in which the state of charge temporarily decreases during the discharging processing, there is a concern that when the main battery fails while the state of charge of the sub-battery is low, the sub-battery may not be able to backup the system. Therefore, the estimation method of the full charge capacity using the current integration method cannot be easily applied to the sub-battery.

Accordingly, there is room for further study regarding an appropriate method for estimating the full charge capacity of redundant system batteries such as sub-batteries.

The present disclosure has been made in view of the above issue, and it is an object thereof to provide a full charge capacity estimation device and a method that can realize estimation of the full charge capacity of a redundant system battery in a region in which the state of charge is high, without performing discharging that temporarily lowers the state of charge of the redundant system battery.

In order to solve the above issue, an aspect of technology of the present disclosure is a full charge capacity estimation device that estimates a full charge capacity of a battery of a redundant system that supplies electric power to a redundant load installed in a vehicle, the full charge capacity estimation device including an acquisition unit that acquires a voltage of the battery, a determination unit that determines whether polarization of the battery is resolved after an ignition switch of the vehicle is turned off, a measurement unit that, when determination is made that the polarization of the battery is resolved, measures an amount of time from a time of the determination until the voltage of the battery decreases to a first threshold value due to dark current consumption by the redundant load, and a calculation unit that, when the amount of the time that is measured is no lower than a second threshold value, calculates a state of charge (SOC) of the battery based on an SOC-open circuit voltage (OCV) characteristic curve before deterioration, and when the amount of the time that is measured is lower than the second threshold value, calculates the state of charge of the battery based on the SOC-OCV characteristic curve following deterioration.

According to the above-described full charge capacity estimation device and method of the present disclosure, estimation of the full charge capacity can be realized with good precision regarding a redundant system battery such as a sub-battery or the like provided for backup of a main battery, while maintaining a state of charge necessary for backup of a redundant power supply system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The full charge capacity estimation device and method of the present disclosure measures the elapsed time until the voltage of the redundant system battery drops to a predetermined voltage after the polarization of the redundant system battery is resolved. Then, based on the measurement time, it is decided whether to calculate the state of charge of the redundant system battery based on the SOC-OCV characteristic curve before deterioration, or whether to calculate the state of charge of the redundant battery based on the SOC-OCV characteristic curve after deterioration.

Hereinafter, an embodiment of the present disclosure will be described in detail with reference to the drawings.

Embodiment

Configuration

Figure 1:
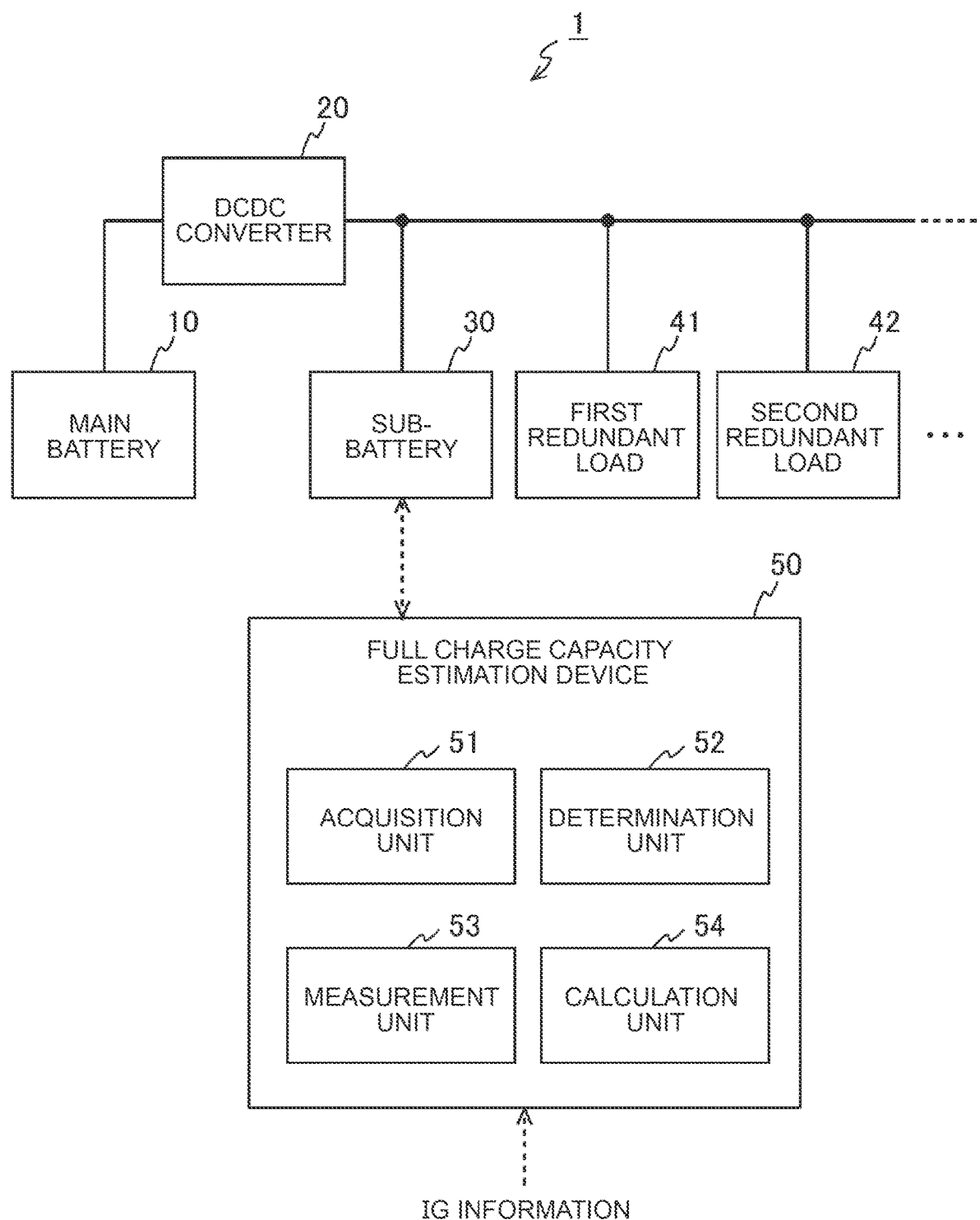
FIG. 1 is a functional block diagram of a redundant power supply system including a full charge capacity estimation device and its peripheral parts according to an embodiment of the present disclosure.

FIG. 1 is a functional block diagram of a redundant power supply system 1 including a full charge capacity estimation device 50 and its peripheral parts according to an embodiment of the present disclosure. The redundant power supply system 1 illustrated in FIG. 1 includes a main battery 10, a DC/DC converter 20, a sub-battery 30, and a full charge capacity estimation device 50. In FIG. 1, connection lines through which electric power flows are shown as solid lines, and connection lines through which detection signals, control signals, etc. flow are shown as dotted lines.

A redundant power supply system 1 shown in FIG. 1 is installed in a vehicle equipped with an automatic driving system. In the following embodiments, the redundant power supply system 1 is installed in a vehicle such as a hybrid electric vehicle (HEV), a plug-in hybrid electric vehicle (PHEV), and a battery electric vehicle (BEV) that use an electric motor as a power supply. The control of the full charge capacity estimation device 50 according to the present embodiment will be described by taking as an example a case where the full charge capacity estimation device 50 according to the present embodiment has the following conditions.

The main battery 10 is a secondary battery configured to be chargeable and dischargeable, and is, for example, a lead acid battery. Main battery 10 is connected to DCDC converter 20. The main battery 10 supplies the electric power stored therein to the sub-battery 30, the first redundant load 41, and the second redundant load 42 via the DCDC converter 20. The main battery 10 functions as a primary power supply that supplies electric power to the first redundant load 41 and the second redundant load 42 during normal times when no abnormality such as power failure occurs.

DCDC converter 20 connects main battery 10, sub-battery 30, first redundant load 41, and second redundant load 42. DCDC converter 20 is a power converter for supplying electric power from main battery 10 to sub-battery 30, first redundant load 41, and second redundant load 42. When supplying electric power, the DCDC converter 20 can convert the input voltage of the main battery 10 into a predetermined voltage and output it.

The sub-battery 30 is a secondary battery configured to be chargeable and dischargeable, and is, for example, a lithium-ion battery. An example of the lithium-ion battery is an iron phosphate lithium-ion battery (LFP battery). In iron phosphate lithium-ion batteries, the absolute value of the rate of change in open circuit voltage with respect to the state of charge is a predetermined value in the SOC-OCV characteristic curve that shows the relationship between the battery's state of charge (SOC) and open circuit voltage (OCV). It has the following flat area. Sub-battery 30 is connected to DCDC converter 20, first redundant load 41, and second redundant load 42. The sub-battery 30 supplies the electric power stored therein to the first redundant load 41 and the second redundant load 42. The sub-battery 30 is charged with electric power output from the main battery 10 via the DCDC converter 20. This sub-battery 30 functions as a backup redundant power supply (redundant system battery) that supplies electric power to the first redundant load 41 and the second redundant load 42 when an emergency such as an abnormality including a failure of the main battery 10.

The first redundant load 41 and the second redundant load 42 are components such as an electronic control unit (ECU) or a system mounted on the vehicle. The first redundant load 41 in this embodiment is a load that requires a redundant power supply only when the vehicle is performing automatic driving. Examples of the first redundant load 41 include ECUs and systems such as electric power steering (EPS) and advanced driving assistance (ADAS). The second redundant load 42 in this embodiment is a load that requires a redundant power supply not only when the vehicle is running automatically but also when the driver is manually driving the vehicle. Examples of the second redundant load 42 include ECUs and systems such as shift-by-wire (SBW) and electric brake (EBK). Note that the vehicle may be equipped with not only the first redundant load 41 and the second redundant load 42 illustrated in FIG. 1, but also loads that do not require a redundant power supply.

The full charge capacity estimation device 50 is configured to perform various processes and controls related to estimating the full charge capacity of the sub-battery 30. The full charge capacity estimation device 50 of this embodiment includes at least an acquisition unit 51, a determination unit 52, a measurement unit 53, and a calculation unit 54.

The acquisition unit 51 acquires the voltage of the sub-battery 30. The voltage of the sub-battery 30 can be obtained, for example, via a detection element (not shown) such as a voltage sensor provided in the sub-battery 30.

The determination unit 52 determines whether the polarization of the sub-battery 30 has been resolved after the ignition switch of the vehicle is turned off (IG-OFF). To determine whether to depolarize the sub-battery 30, a well-known method such as waiting for a predetermined time to elapse after IG-OFF can be used. The state of the ignition switch of the vehicle can be ascertained based on IG information provided from the ECU of the vehicle.

Figure 3:
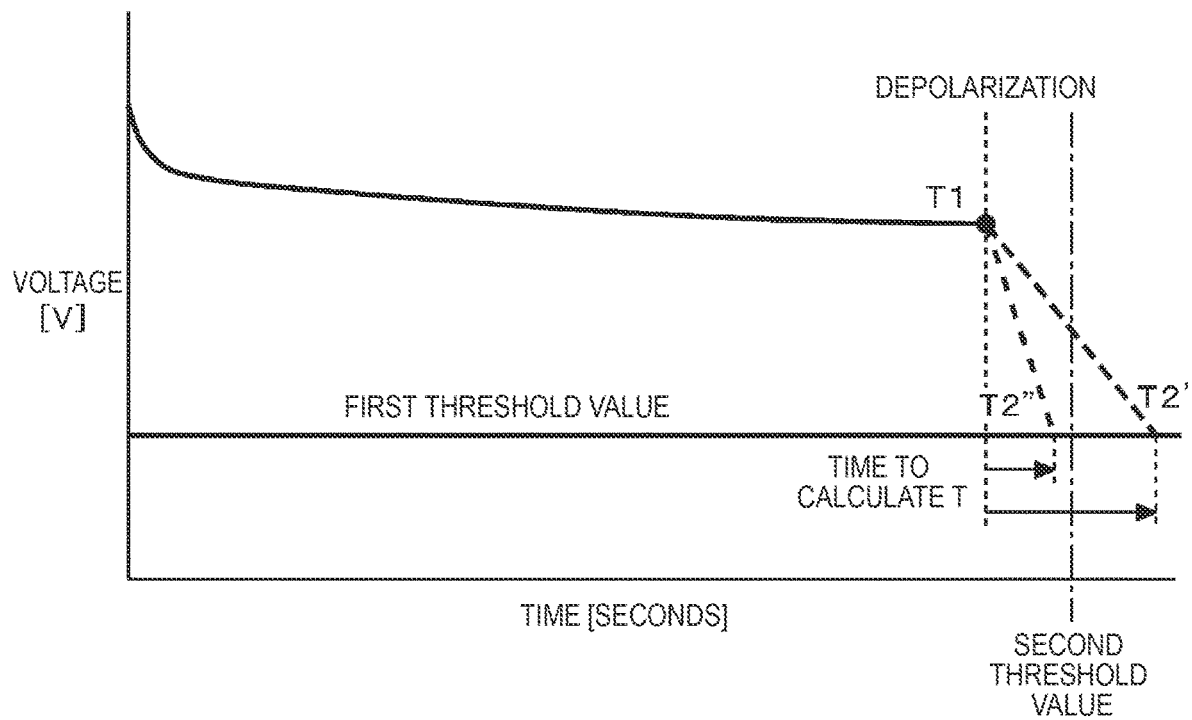
FIG. 3 is a diagram explaining the relationship between the voltage drop due to depolarization of the sub-battery and measurement time.

When the determination unit 52 determines that the polarization of the sub-battery 30 has been resolved, the measurement unit 53 determines that the voltage of the sub-battery 30 decreases to a predetermined voltage (hereinafter referred to as "first threshold value") from the time of the determination. Measure the elapsed time. Specifically, the measurement unit 53 measures the measurement time T (=T2−T1) up to time T2. The time T2 is a point at which the voltage of the sub-battery 30 drops to the first threshold value from the time T1 at which the polarization of the sub-battery 30 is resolved due to the dark current consumed by the first redundant load 41 and/or the second redundant load 42 after IG-OFF. FIG. 3 is a diagram for explaining the measurement time T measured by the measurement unit 53. The first threshold value is preferably a voltage in a flat region in the SOC-OCV characteristic curve of the sub-battery 30 (charging voltage threshold value).

Figure 4:
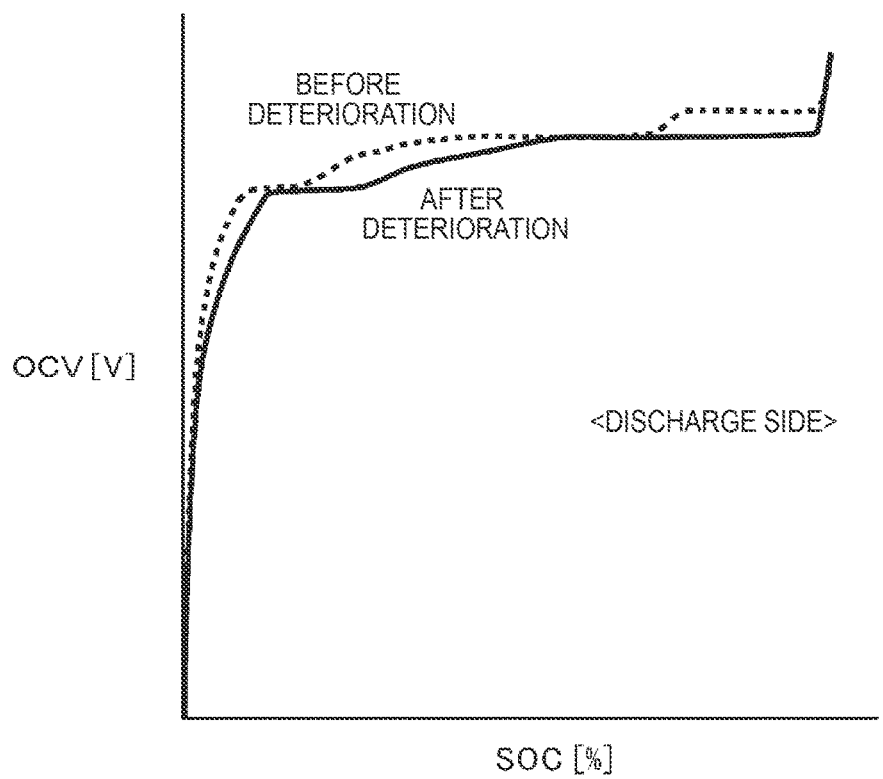
FIG. 4 shows an example of the SOC-OCV characteristic curve before and after deterioration of the sub-battery (discharge side)
Figure 5:
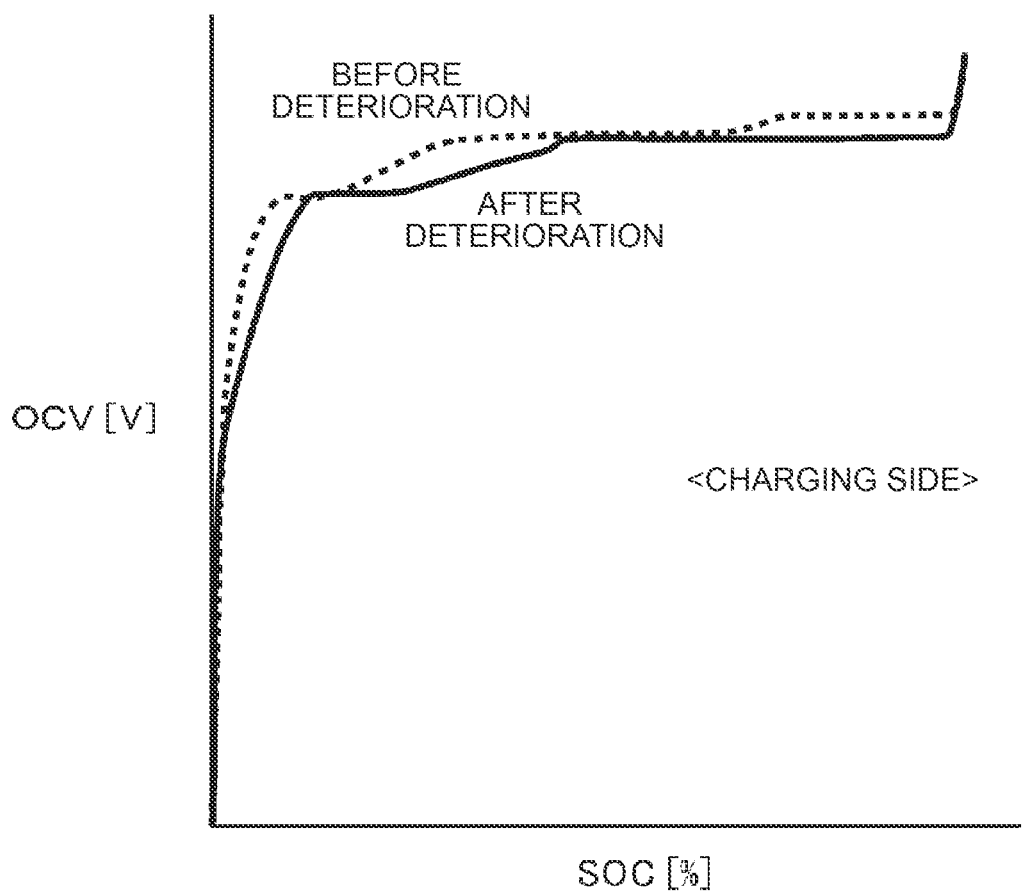
FIG. 5 shows an example of the SOC-OCV characteristic curve before and after deterioration of the sub-battery (charging side).

The calculation unit 54 determines (selects) a method for calculating the electricity state of charge for estimating the full charge capacity of the sub-battery 30 based on the measurement time T measured by the measurement unit 53. Specifically, when the measurement time T is longer than a predetermined time (hereinafter referred to as "second threshold value") (time T2' in FIG. 3), the calculation unit 54 calculates the SOC-OCV of the sub-battery 30 before deterioration. The state of charge of the sub-battery 30 is calculated (and learned) based on the characteristic curve. Further, when the measurement time T is less than the second threshold value (time T2" in FIG. 3), the calculation unit 54 calculates (and learns) the state of charge of the sub-battery 30 based on the SOC-OCV characteristic curve after deterioration of the sub-battery 30. The SOC-OCV characteristic curve before/after deterioration of the sub-battery 30 is determined in advance. FIG. 4 is a diagram showing an example of the SOC-OCV characteristic curve before deterioration (dotted line) and the SOC-OCV characteristic curve after deterioration (solid line) regarding the discharge side of the sub-battery 30. Further, FIG. 5 is a diagram showing an example of an SOC-OCV characteristic curve before deterioration (dotted line) and an SOC-OCV characteristic curve after deterioration (solid line) regarding the charging side of the sub-battery 30. The power state of charge calculated (and learned) in this way is used as appropriate to estimate the full charge capacity of the sub-battery 30.

Note that a part or all of the above-described full charge capacity estimation device 50 may be typically configured as an ECU including a processor, a memory, an input/output interface, and the like. This ECU realizes all or part of the functions performed by the acquisition unit 51, the determination unit 52, the measurement unit 53, and the calculation unit 54 by having a processor read and execute a program stored in the memory.

Control

Figure 2:
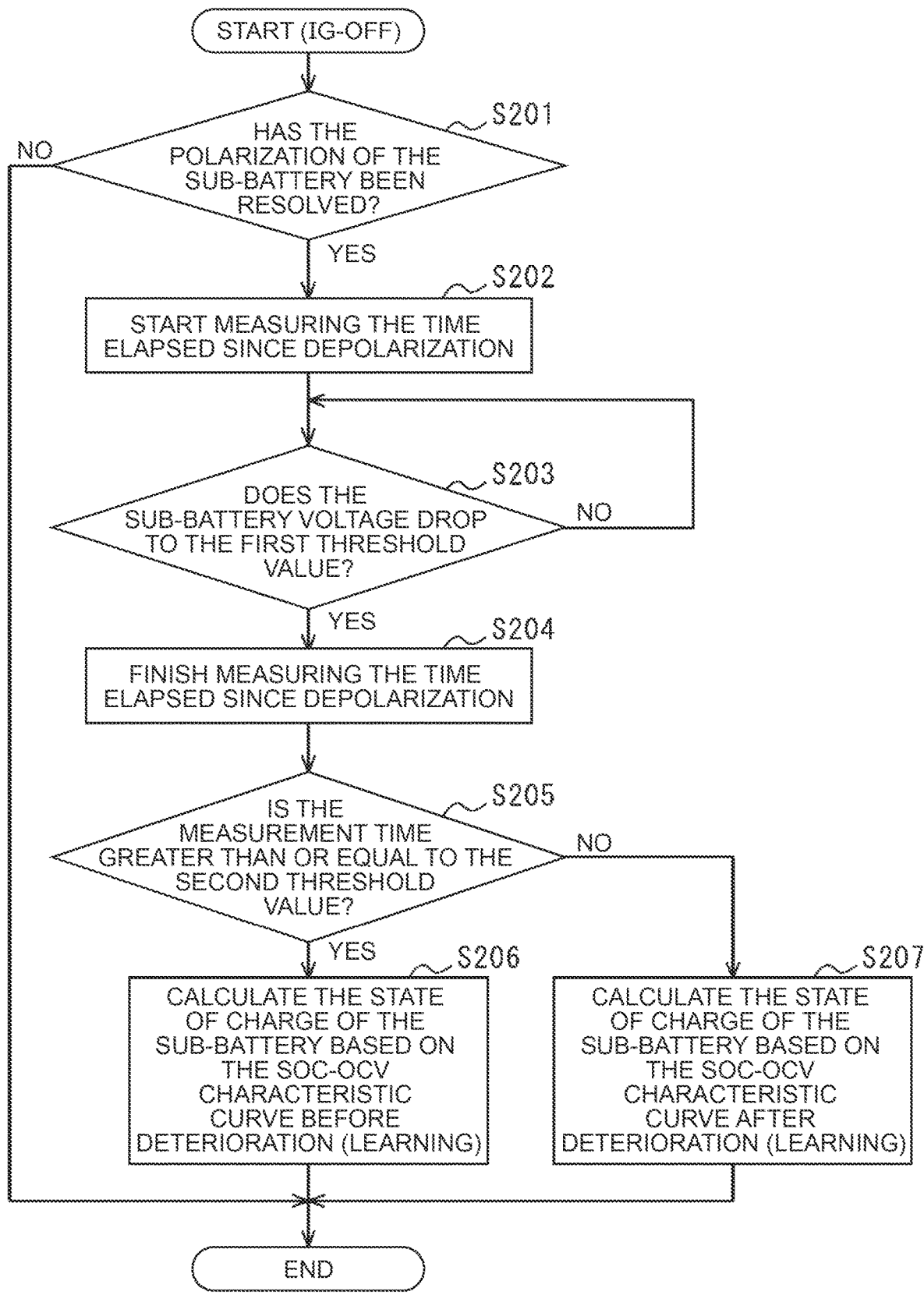
FIG. 2 is a processing flowchart of a full charge capacity estimation method according to an embodiment of the present disclosure.

Next, with further reference to FIG. 2, control performed by the full charge capacity estimation device 50 according to an embodiment of the present disclosure will be described. FIG. 2 is a flowchart showing the processing procedure of the estimation method for the full charge capacity of the sub-battery 30, which is executed by each component of the full charge capacity estimation device 50. The full charge capacity estimation process shown in FIG. 2 is started, for example, when the ignition switch of the vehicle is turned off (IG-OFF).

S201

The determination unit 52 determines whether the polarization of the sub-battery 30 has been resolved after the ignition switch of the vehicle is turned off (IG-OFF) and the main full charge capacity estimation process is started. By this determination, it is possible to resolve the influence of polarization occurring in the sub-battery 30 on the voltage. This determination is preferably made after waiting for a predetermined time period during which it can be assumed that the polarization of the sub-battery 30 has been resolved.

If the determination unit 52 determines that the polarization of the sub-battery 30 has been resolved (S201, Yes), the process advances to S202. On the other hand, if the determination unit 52 determines that the polarization of the sub-battery 30 has not been resolved (S201, No), the sub-battery 30 is not in a situation where it can calculate a state of charge effective for estimating the full charge capacity. It is determined that this is the case, and the process of estimating the full charge capacity of the sub-battery 30 is ended. In this case, normal control after IG-OFF, which is predetermined for the vehicle, is performed.

S202

The measurement unit 53 starts measuring the time that has passed since the determination unit 52 determines that the polarization of the sub-battery 30 has been resolved. To measure the time, a clock function provided in the full charge capacity estimation device 50, in-vehicle navigation, or the like can be used. When the measurement unit 53 starts measuring the time that has passed since the polarization of the sub-battery 30 is resolved, the process advances to S203.

S203

The measurement unit 53 monitors the voltage of the sub-battery 30 acquired by the acquisition unit 51, and determines whether the voltage of the sub-battery 30 has decreased (reached) the first threshold value. In order to estimate the full charge capacity of the sub-battery 30 in a region where the state of charge is high (for example, from 90% to 100%), it is preferable to use as the first threshold value 1 a voltage in the flat region (charging voltage threshold value) in the SOC-OCV characteristics curve. The voltage drop in the sub-battery 30 is caused by dark current consumption by vehicle loads such as the first redundant load 41 and/or the second redundant load 42 after IG-OFF.

If the measurement unit 53 determines that the voltage of the sub-battery 30 has decreased (reached) the first threshold value (S203, Yes), the process proceeds to S204. On the other hand, if the measurement unit 53 determines that the voltage of the sub-battery 30 has not yet decreased (reached) the first threshold value (S203, No), the process waits until the voltage of the sub-battery 30 has decreased to the first threshold value.

S204

The measurement unit 53 finishes measuring the time that has passed since the polarization of the sub-battery 30 is resolved. As a result, the time (measurement time) required for the voltage of the sub-battery 30 to decrease (reach) the first threshold value after the polarization of the sub-battery 30 is resolved can be obtained. When the measurement unit 53 finishes measuring the time that has passed since the polarization of the sub-battery 30 is resolved, the process advances to S205.

S205

The calculation unit 54 determines whether the measurement time measured by the measuring unit 53 is equal to or greater than a second threshold value. This determination is made in order to estimate the deterioration state of the sub-battery 30 based on the time taken to resolve polarization.

If the calculation unit 54 determines that the measured time is equal to or greater than the second threshold value (S205, Yes), the process proceeds to S206. On the other hand, if the calculation unit 54 determines that the measured time is less than the second threshold value (S205, No), the process proceeds to S207.

S206

The calculation unit 54 calculates the state of charge of the sub-battery 30 from the closed circuit voltage (CCV) before deterioration based on the SOC-OCV characteristic curve of the sub-battery 30 before deterioration, assuming that the sub-battery 30 has not deteriorated yet. This calculated state of charge of the sub-battery 30 is learned as appropriate and used for estimating the full charge capacity of the sub-battery 30. When the state of charge of the sub-battery 30 is calculated from the closed circuit voltage (CCV) of the sub-battery 30 before deterioration, the process of estimating the full charge capacity of the sub-battery 30 ends.

S207

The calculation unit 54 calculates the state of charge from the closed circuit voltage (CCV) of the sub-battery 30 after deterioration based on the SOC-OCV characteristic curve after the deterioration of the sub-battery 30, assuming that the deterioration of the sub-battery 30 is progressing. This calculated state of charge of the sub-battery 30 is learned as appropriate and used for estimating the full charge capacity of the sub-battery 30. When the state of charge of the sub-battery 30 is calculated from the closed circuit voltage (CCV) of the sub-battery 30 after deterioration, the process of estimating the full charge capacity of the sub-battery 30 ends.

In addition, in the process of estimating the full charge capacity of the sub-battery 30 described above, the voltage of the sub-battery 30 is set as a fixed value (first threshold value), and the time that has elapsed since the polarization of the sub-battery 30 is resolved (measured time) is calculated. The required method was explained. However, the voltage of the sub-battery 30 may be determined by setting the elapsed time after the polarization of the sub-battery 30 is resolved as a fixed value (second threshold value).

When determining the voltage of the sub-battery 30 described above, for example, if the voltage of the sub-battery 30 at the time when the second threshold value time has elapsed is less than the first threshold value, processing can be performed to calculate the state of charge of the sub-battery 30 based on the SOC-OCV characteristic curve of the sub-battery 30 before deterioration. Further, if the voltage of the sub-battery 30 is equal to or higher than the first threshold value after the second threshold value time has elapsed, processing can be performed to calculate the state of charge of the sub-battery 30 based on the SOC-OCV characteristic curve of the sub-battery 30 after deterioration.

Operations and Effects

As described above, in the full charge capacity estimation device 50 and the method according to the embodiment of the present disclosure, the elapsed time after the polarization of the sub-battery 30 is resolved until the voltage of the sub-battery 30 in the redundant power supply system 1 drops to a voltage in the flat region in the SOC-OCV characteristic curve is measured. Then, depending on the measured time, whether to calculate the state of charge of the sub-battery 30 based on the SOC-OCV characteristic curve of the sub-battery 30 before deterioration or based on the SOC-OCV characteristic curve of the sub-battery 30 after deterioration. It is suitably determined whether to calculate the electricity state of charge of the sub-battery 30 based on the above.

This process makes it possible to estimate the full charge capacity of the sub-battery 30 in a region where the state of charge is high without performing discharging that temporarily lowers the state of charge of the sub-battery 30.

Furthermore, in the present full charge capacity estimation device 50 and method, there is no need to temporarily lower the state of charge of the sub-battery 30 in the process of estimating the full charge capacity. Therefore, in the event that the main battery 10 fails, it is possible to prevent the sub-battery 30 from being unable to supply backup electric power to the first redundant load 41 and the second redundant load 42.

Although one embodiment of the present disclosure has been described above, the present disclosure covers not only the full charge capacity estimation device described above and the full charge capacity estimating method executed by the full charge capacity estimation device including a processor and a memory, but also the full charge capacity estimation method. It can be understood as a program for a charging capacity estimation method, a computer-readable non-temporary recording medium that stores the program, or a vehicle equipped with a full charge capacity estimation device.

The full charge capacity estimation device and method of the present disclosure can be used when it is desired to accurately estimate the full charge capacity of a redundant system battery.

What is claimed is:

1. A full charge capacity estimation device that estimates a full charge capacity of a battery of a redundant system that supplies electric power to a redundant load installed in a vehicle, the full charge capacity estimation device comprising:
    an acquisition unit that acquires a voltage of the battery;
    a determination unit that determines whether polarization of the battery is resolved after an ignition switch of the vehicle is turned off;
    a measurement unit that, when determination is made that the polarization of the battery is resolved, measures an amount of time from a time of the determination until the voltage of the battery decreases to a first threshold value due to dark current consumption by the redundant load; and
    a calculation unit that, when the amount of the time that is measured is no lower than a second threshold value, calculates a state of charge (SOC) of the battery based on an SOC-open circuit voltage (OCV) characteristic curve before deterioration, and when the amount of the time that is measured is lower than the second threshold value, calculates the state of charge of the battery based on the SOC-OCV characteristic curve following deterioration.

2. The full charge capacity estimation device according to claim 1, wherein the battery is a lithium-ion battery that includes a flat region in the SOC-OCV characteristic curve in which a rate of change in open circuit voltage with respect to the state of charge is no greater than a predetermined value.

3. The full charge capacity estimation device according to claim 2, wherein the first threshold value is a voltage in the flat region of the SOC-OCV characteristic curve.

4. A full charge capacity estimation method executed by a computer of a device that estimates a full charge capacity of a battery of a redundant system that supplies electric power to a redundant load installed in a vehicle, the full charge capacity estimation method comprising:
    acquiring a voltage of the battery;
    determining whether polarization of the battery is resolved after an ignition switch of the vehicle is turned off;
    measuring, when determination is made that the polarization of the battery is resolved, an amount of time from a time of the determination until the voltage of the battery decreases to a first threshold value due to dark current consumption by the redundant load; and
    calculating, when the amount of the time that is measured is no lower than a second threshold value, a state of charge (SOC) of the battery based on an SOC-open circuit voltage (OCV) characteristic curve before deterioration, and calculating, when the amount of the time that is measured is lower than the second threshold value, the state of charge of the battery based on the SOC-OCV characteristic curve following deterioration.

5. The full charge capacity estimation method according to claim 4, wherein the battery is a lithium-ion battery that includes a flat region in the SOC-OCV characteristic curve in which a rate of change in open circuit voltage with respect to the state of charge is no greater than a predetermined value.

6. The full charge capacity estimation method according to claim 5, wherein the first threshold value is a voltage in the flat region of the SOC-OCV characteristic curve.

* * * * *